US012639859B2

(12) United States Patent
Gao et al.

(10) Patent No.: US 12,639,859 B2
(45) Date of Patent: May 26, 2026

(54) FIX-POINT IMPLEMENTATION OF MESH CODEC

(71) Applicant: TENCENT AMERICA LLC, Palo Alto, CA (US)

(72) Inventors: Wen Gao, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 131 days.

(21) Appl. No.: 18/582,090

(22) Filed: Feb. 20, 2024

(65) Prior Publication Data

US 2024/0282011 A1     Aug. 22, 2024

Related U.S. Application Data

(60) Provisional application No. 63/447,303, filed on Feb. 21, 2023.

(51) Int. Cl.
*G06T 9/00* (2006.01)
(52) U.S. Cl.
CPC ................................... *G06T 9/001* (2013.01)
(58) Field of Classification Search
CPC ...................................................... G06T 9/001
See application file for complete search history.

(56) References Cited

U.S. PATENT DOCUMENTS

| | | | |
|---|---|---|---|
| 2005/0053141 A1 | 3/2005 | Holcomb et al. | |
| 2007/0009039 A1* | 1/2007 | Ryu ..................... | H04N 19/139 |
| | | | 375/E7.091 |
| 2011/0285708 A1 | 11/2011 | Chen et al. | |
| 2012/0013608 A1* | 1/2012 | Ahn ..................... | H04N 19/184 |
| | | | 345/419 |

(Continued)

FOREIGN PATENT DOCUMENTS

WO     2022/067790 A1     4/2022

OTHER PUBLICATIONS

International Search Report issued May 17, 2024 in Application No. PCT/US24/16669.

(Continued)

*Primary Examiner* — Terrell M Robinson
(74) *Attorney, Agent, or Firm* — Sughrue Mion, PLLC

(57) ABSTRACT

Systems, devices, and methods for fixed point implementation of a subdivision processing for video decoding are provided, which may include obtaining two vertices associated with an encoded mesh, determining a first normal vector and a second normal vector with integer components. It may also include determining a first normalized normal vector based on the first normal vector and a second normalized normal vector based on the second normal vector using an inverse square root function and determining a middle normalized normal vector associated with a middle-point based on the combination of the fix-point number with the first pre-defined number of digits, the right-shift operation by the second pre-defined number, and the components (Continued)

700

705 — Obtain At Least Two Vertices From Encoded Mesh

710 — Determine First and Second Normal Vector (With Integer Components) Associated With the First and Second Vertex 715 — Determine First And Second Normalized Normal Vector Based On A Combination Of A Fix-point Number With A First Pre-defined Number Of Digits and A Right-shift Operation By A Second Pre-defined Number 720 — Determine A Middle Normalized Normal Vector Associated With A Middle Point Based On A Combination Of The Fix-point Number With The First Pre-defined Number Of Digits and The Right-shift Operation By The Second Pre-defined Number 725 — Decode The Encoded Mesh Based On The First Normalized Normal Vector, Second Normalized Normal Vector, and Middle Normalized Normal Vector of the middle-point. It may also include decoding the encoded mesh based on the first normalized normal vector, the second normalized normal vector, and the middle normalized normal vector.

14 Claims, 11 Drawing Sheets

(56) References Cited

U.S. PATENT DOCUMENTS

| | | | |
|---|---|---|---|
| 2014/0184430 A1* | 7/2014 | Jiang | G06T 9/40 |
| | | | 341/55 |
| 2018/0268570 A1* | 9/2018 | Budagavi | G06T 9/001 |
| 2020/0053391 A1 | 2/2020 | Mammou et al. | |
| 2021/0149635 A1 | 5/2021 | Rhisheekesan et al. | |
| 2022/0207781 A1* | 6/2022 | Zhang | H04N 19/85 |
| 2023/0005188 A1* | 1/2023 | Tourapis | G06T 9/001 |
| 2023/0237705 A1* | 7/2023 | Wan | H04N 19/96 |
| | | | 382/232 |

OTHER PUBLICATIONS

Written Opinion issued May 17, 2024 in Application No. PCT/US24/16669.

"V-Mesh Test Model v1", International Organization for Standardization Organisation Internationale De Normalisation, ISO/IEC JTC 1/SC 29/WG 7, MPEG 3D Graphics and Haptics Coding, No. 0404, Jul. 2022 (3 pages total).

"CfP for Dynamic Mesh Coding", International Organization for Standardization Organisation Internationale De Normalisation, ISO/IEC JTC 1/SC 29/WG 2, MPEG Technical requirements, N145, Oct. 2021 (39 pages total).

Mammou et al., "[V-CG] Apple's Dynamic Mesh Coding CfP Response", International Organisation for Standardisation Organisation Internationale De Normalisation ISO/IEC JTC 1/SC 29/WG 7 Coding of Moving Pictures and Audio, ISO/IEC JTC 1/SC 29/WG 7, m59281, Apr. 2022 (24 pages total).

* cited by examiner

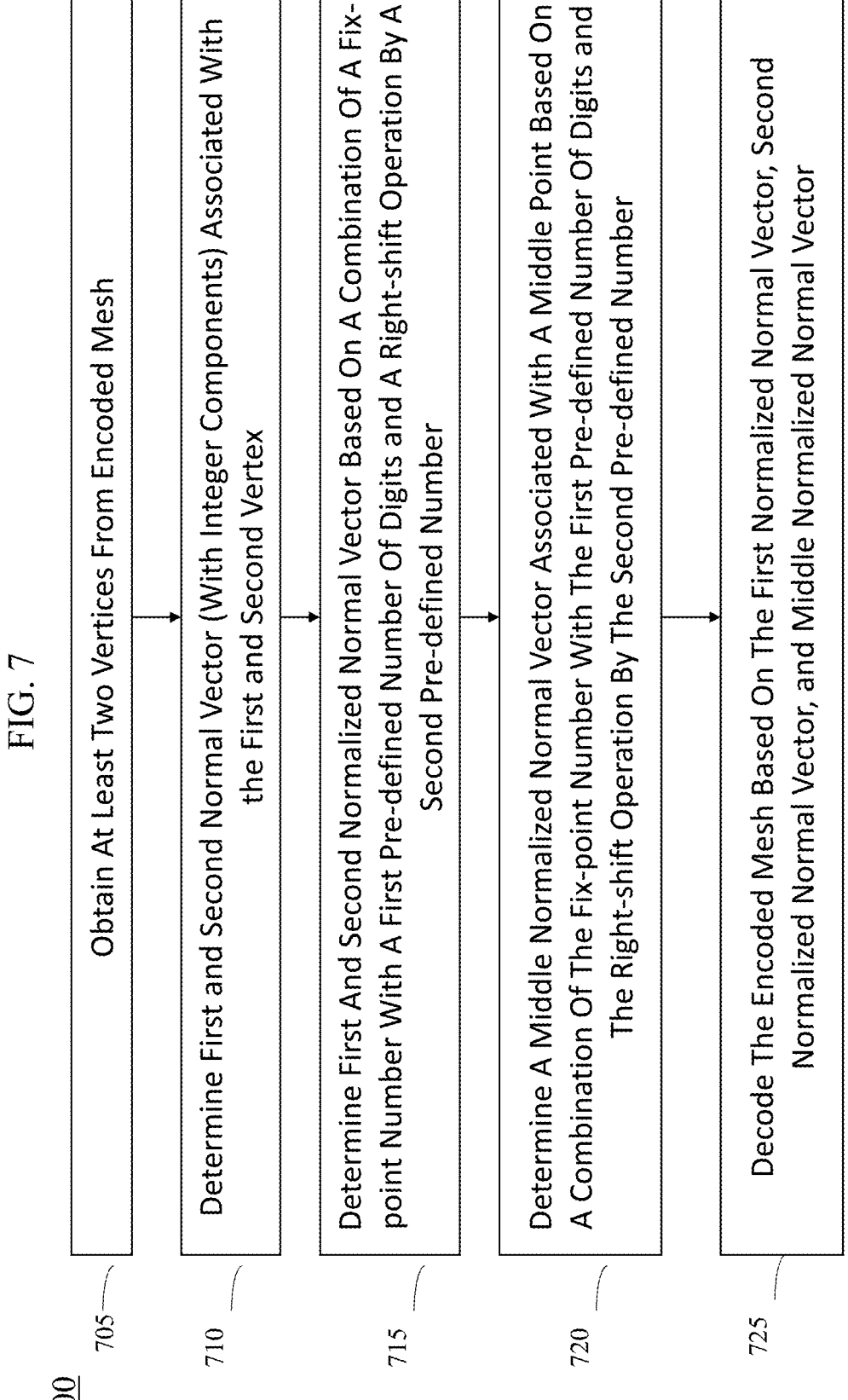

700

705 — Obtain At Least Two Vertices From Encoded Mesh

710 — Determine First and Second Normal Vector (With Integer Components) Associated With the First and Second Vertex 715 — Determine First And Second Normalized Normal Vector Based On A Combination Of A Fix-point Number With A First Pre-defined Number Of Digits and A Right-shift Operation By A Second Pre-defined Number 720 — Determine A Middle Normalized Normal Vector Associated With A Middle Point Based On A Combination Of The Fix-point Number With The First Pre-defined Number Of Digits and The Right-shift Operation By The Second Pre-defined Number 725 — Decode The Encoded Mesh Based On The First Normalized Normal Vector, Second Normalized Normal Vector, and Middle Normalized Normal Vector

FIG. 8

FIX-POINT IMPLEMENTATION OF MESH CODEC

CROSS-REFERENCE TO RELATED APPLICATION(S)

The present application claims priority from U.S. Provisional Application No. 63/447,303, filed with the U.S. Patent and Trademark Office on Feb. 21, 2023, the disclosure of which is incorporated herein in its entirety.

FIELD

Embodiments of this disclosure are directed to video coding and decoding. Specifically, embodiments of the present disclosure are to encoding and decoding 3D meshes including fixed point implementation for mesh encoding and decoding.

BACKGROUND

The advances in 3D capture, modeling, and rendering have promoted the ubiquitous presence of 3D contents across several platforms and devices. It is possible to capture a baby's first step in one continent and allow the grandparents to see (and maybe interact) and enjoy a full immersive experience with the child in another continent. 3D meshes are widely used to represent such immersive contents. However, in order to achieve such realism, models are becoming ever more sophisticated, and a significant amount of data is linked to the creation and consumption of those models. Therefore, methods and systems that reduce the computational overhead for the creation and use of such models are needed.

SUMMARY

According to one or more embodiments, a method for fixed point implementation of a subdivision processing for video decoding may be provided. The method, performed by at least one processor, may include obtaining, from a coded bitstream, two vertices associated with an encoded mesh; determining a first normal vector associated with a first vertex and a second normal vector associated with a second vertex, wherein components of the first normal vector and the second normal vector are integers; determining a first normalized normal vector based on the first normal vector and a second normalized normal vector based on the second normal vector using an inverse square root function, wherein a normalized normal vector is determined using a combination of a fix-point number with a first pre-defined number of digits, a right-shift operation by a second pre-defined number, and the components of the respective normal vector; determining a middle normalized normal vector associated with a middle-point, wherein the components of the middle-point are determined based on a combination of the components of the first normal vector and the second normal vector and the right-shift operation by a third pre-defined number, and wherein the middle normalized normal vector is determined using the combination of the fix-point number with the first pre-defined number of digits, the right-shift operation by the second pre-defined number, and the components of the middle-point; and decoding the encoded mesh based on the first normalized normal vector, the second normalized normal vector, and the middle normalized normal vector.

According to one or more embodiments, a device for fixed point implementation of a subdivision processing for video decoding may be provided. The device may include at least one memory configured to store program code; and at least one processor configured to read the program code and operate as instructed by the program code. The program code may include first obtaining code configured to cause the at least one processor to obtain, from a coded bitstream, two vertices associated with an encoded mesh; second determining code configured to cause the at least one processor to determine a first normal vector associated with a first vertex and a second normal vector associated with a second vertex, wherein components of the first normal vector and the second normal vector are integers; third determining code configured to cause the at least one processor to determine a first normalized normal vector based on the first normal vector and a second normalized normal vector based on the second normal vector using an inverse square root function, wherein a normalized normal vector is determined using a combination of a fix-point number with a first pre-defined number of digits, a right-shift operation by a second pre-defined number, and the components of the respective normal vector; fourth determining code configured to cause the at least one processor to determine a middle normalized normal vector associated with a middle-point, wherein the components of the middle-point are determined based on a combination of the components of the first normal vector and the second normal vector and the right-shift operation by a third pre-defined number, and wherein the middle normalized normal vector is determined using the combination of the fix-point number with the first pre-defined number of digits, the right-shift operation by the second pre-defined number, and the components of the middle-point; and decoding code configured to cause the at least one processor to decode the encoded mesh based on the first normalized normal vector, the second normalized normal vector, and the middle normalized normal vector.

According to one or more embodiments, a non-transitory computer-readable medium stores instructions, the instructions including: one or more instructions that, when executed by one or more processors of cause the one or more processors to: obtain, from a coded bitstream, two vertices associated with an encoded mesh; determine a first normal vector associated with a first vertex and a second normal vector associated with a second vertex, wherein components of the first normal vector and the second normal vector are integers; determine a first normalized normal vector based on the first normal vector and a second normalized normal vector based on the second normal vector using an inverse square root function, wherein a normalized normal vector is determined using a combination of a fix-point number with a first pre-defined number of digits, a right-shift operation by a second pre-defined number, and the components of the respective normal vector; determine a middle normalized normal vector associated with a middle-point, wherein the components of the middle-point are determined based on a combination of the components of the first normal vector and the second normal vector and the right-shift operation by a third pre-defined number, and wherein the middle normalized normal vector is determined using the combination of the fix-point number with the first pre-defined number of digits, the right-shift operation by the second pre-defined number, and the components of the middle-point; and decode the encoded mesh based on the first normalized normal vector, the second normalized normal vector, and the middle normalized normal vector.

BRIEF DESCRIPTION OF THE DRAWINGS

Further features, the nature, and various advantages of the disclosed subject matter will be more apparent from the following detailed description and the accompanying drawings in which:

FIG. 4 is a schematic illustration of a simplified block diagram of an exemplary process for V-Mesh decoding, in accordance with embodiments of the present disclosure.

FIG. 7 is an exemplary process for mesh decoding, in accordance with embodiments of the present disclosure.

FIG. 8 is an exemplary diagram of a computer system suitable for implementing embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
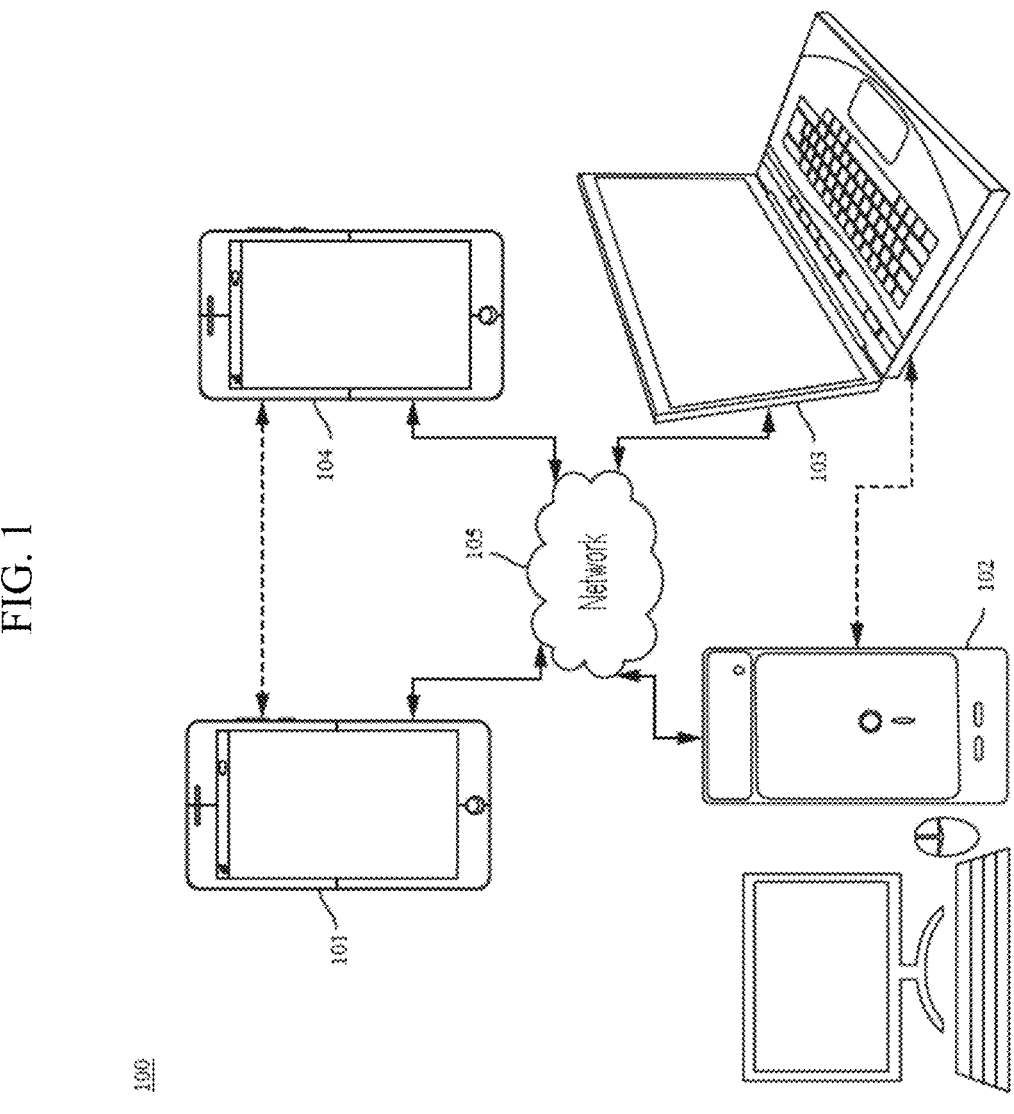
FIG. 1 is a schematic illustration of a simplified block diagram of a communication system, in accordance with embodiments of the present disclosure.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
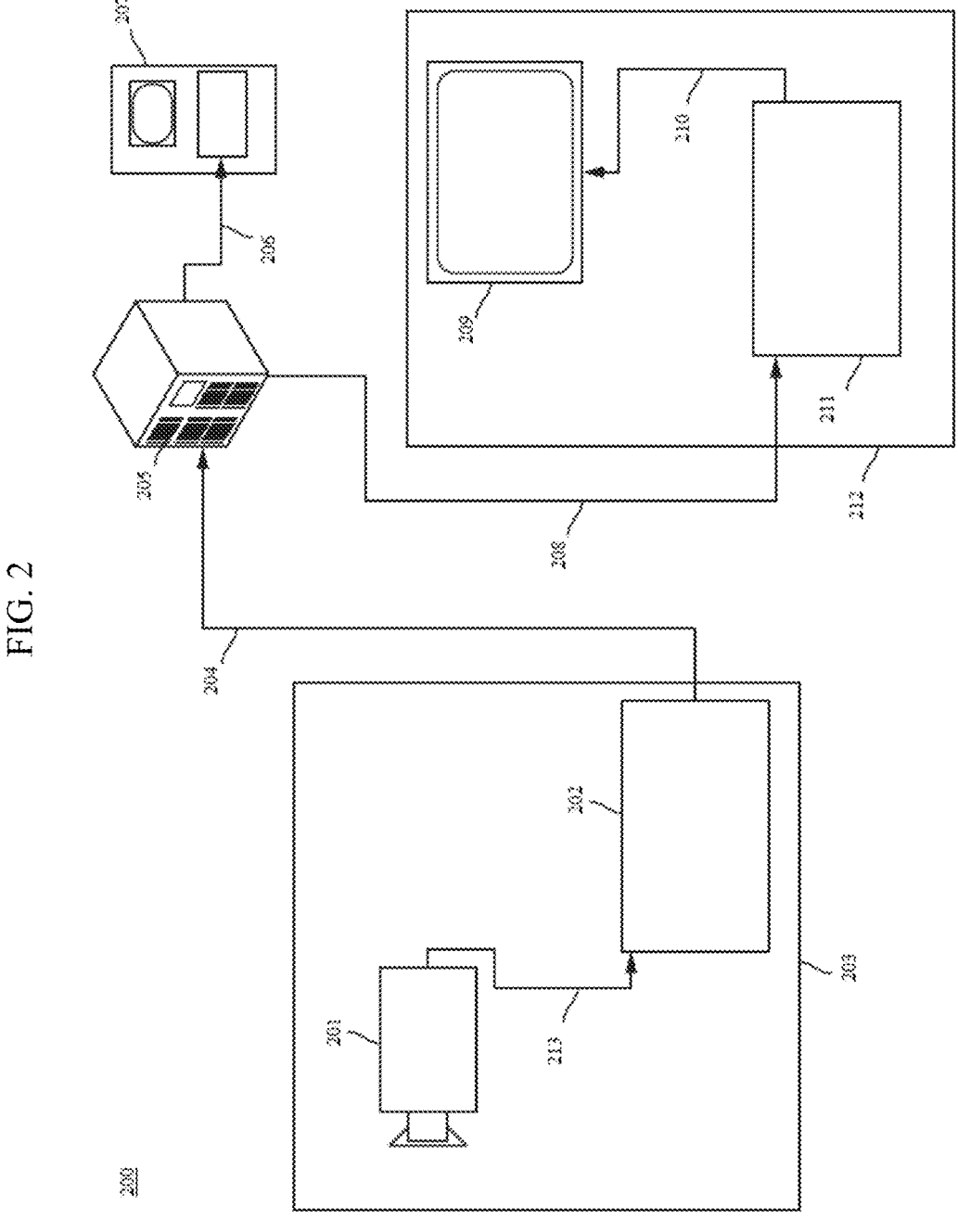
FIG. 2 is a schematic illustration of a simplified block diagram of a streaming system, in accordance with embodiments of the present disclosure.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

According to exemplary embodiments further described below, the term "mesh" indicates a composition of one or more polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping may be described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading according to exemplary embodiments.

Nonetheless, a dynamic mesh sequence may require a large amount of data since it may consist of a significant amount of information changing over time. For example, in contrast to a "static mesh", or "static mesh sequence," in which information of that mesh may not change from one frame to another, a "dynamic mesh", or a "dynamic mesh sequence", indicates motion in which ones of vertices represented by that mesh change from one frame to another. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. According to exemplary embodiments herein, there is described aspects of a new mesh compression standards to directly handle dynamic meshes with time varying connectivity information and optionally time varying attribute maps, this standard targets lossy, and lossless compression for various applications, such as real-time communications, storage, free viewpoint video, AR and VR. Functionalities such as random access and scalable/progressive coding are also considered.

Mesh geometry information consists of vertex connectivity information, 3D coordinates, and 2D texture coordinates, etc. The compression of vertex 3D coordinates, which is also called vertex position, is very important, as in most cases, it takes up significant portion of the entire geometry related data.

Figure 3:
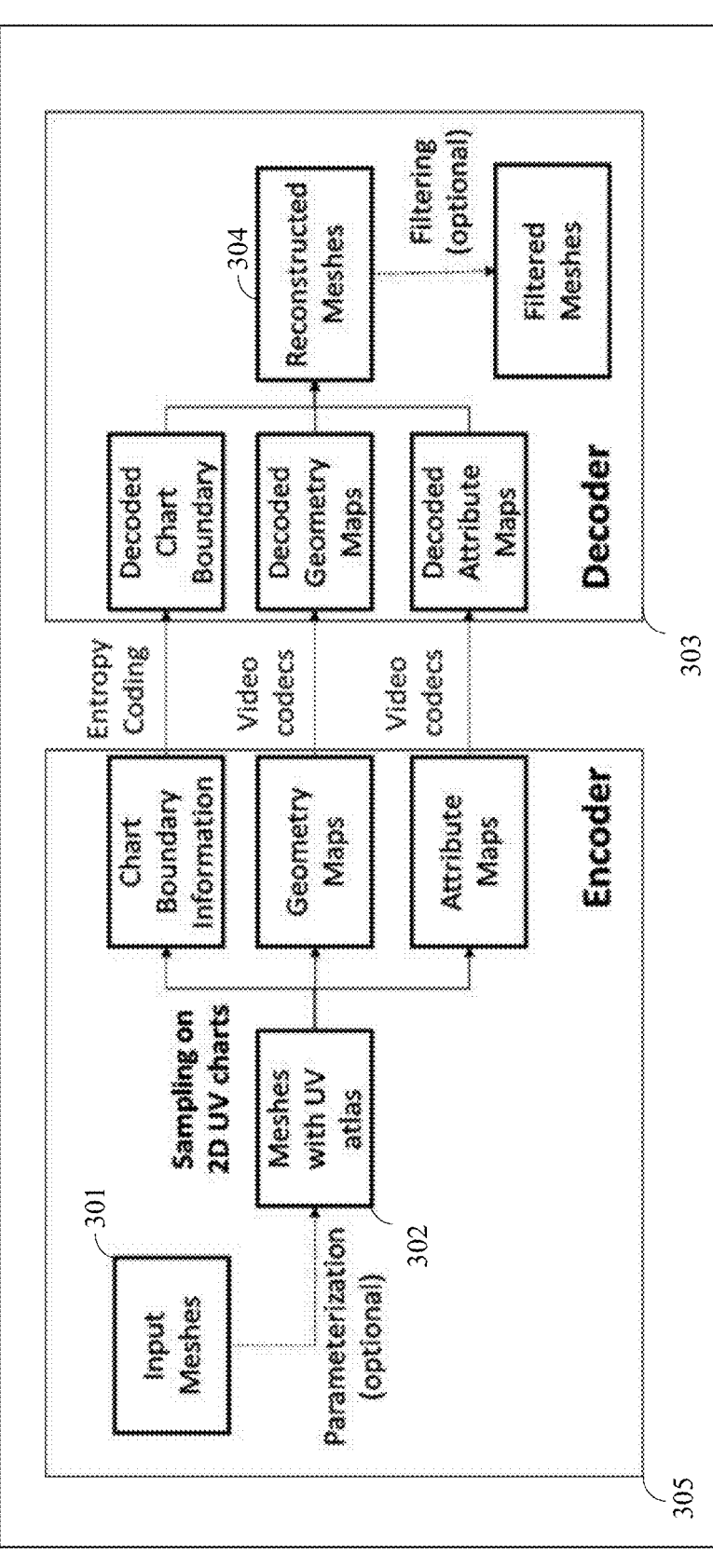
FIG. 3 is a schematic illustration of a simplified block diagram of a video encoder and decoder, in accordance with embodiments of the present disclosure.

FIG. 3 represents an example framework 300 of one dynamic mesh compression such as for a 2D atlas sampling based method. Each frame of the input meshes 301 can be preprocessed by a series of operations, e.g., tracking, remeshing, parameterization, voxelization. Note that, these operations can be encoder-only, meaning they might not be part of the decoding process and such possibility may be signaled in metadata by a flag such as indicating 0 for encoder only and 1 for other. After that, one can get the meshes with 2D UV atlases 302, where each vertex of the mesh has one or more associated UV coordinates on the 2D atlas. Then, the meshes can be converted to multiple maps, including the geometry maps and attribute maps, by sampling on the 2D atlas. Then these 2D maps can be coded by video/image codecs, such as HEVC, VVC, AV1, AVS3, etc. On the decoder 303 side, the meshes can be reconstructed from the decoded 2D maps. Any post-processing and filtering can also be applied on the reconstructed meshes 304. Note that other metadata might be signaled to the decoder side for the purpose of 3D mesh reconstruction. Note that the chart boundary information, including the UV and xyz coordinates, of the boundary vertices can be predicted, quantized and entropy coded in the bitstream. The quantization step size can be configured in the encoder side to tradeoff between the quality and the bitrates.

Figure 4:
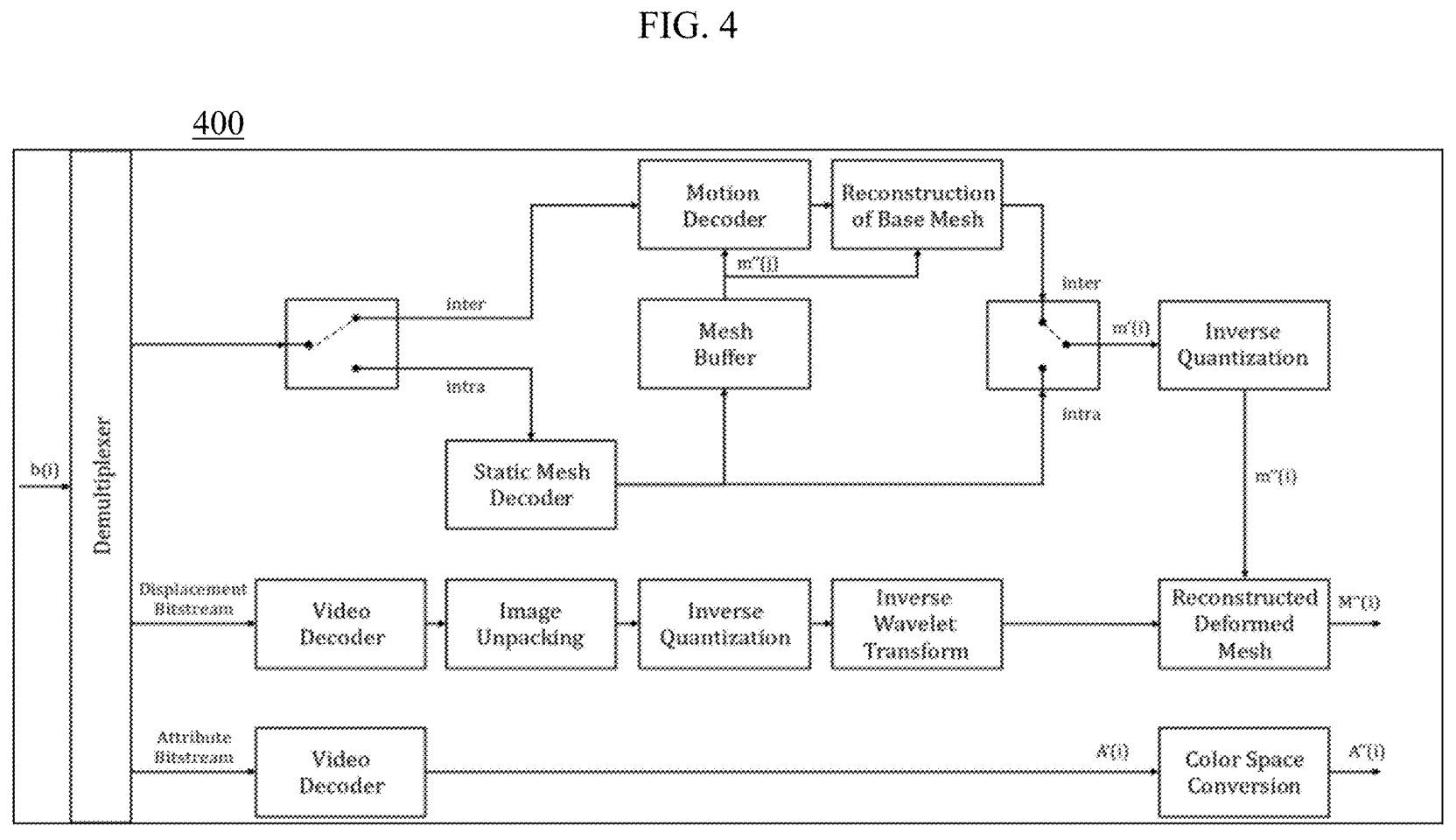

FIG. 4 represents an exemplary block diagram 400 that may be used for evaluation of dynamic mesh coding tools during the standardization process. \

The demultiplexer separates the incoming bitstream into three parts, i.e., base mesh bitstream, displacement bitstream, and attribute bitstream.

Decoding the Base Mesh Bitstream

Depending on coding mode used in the base mesh bitstream, either intra decoding path or inter decoding path is chosen. In the intra decoding path, base mesh is decoded through static mesh decoder. In the inter decoding path, motion vectors are decoded through motion decoder. The vertices in a reference mesh that is stored in the mesh buffer and the decoded motion vectors from the motion decoder are combined to form the reconstructed base mesh. In embodiments, if sub-division process is enabled in the bitstream, a mid-point sub-division process may be applied to generate middle points using the vertices in the base mesh and previously generated middle points. The subdivided mesh is called m"(i) in FIG. 4. After dequantization process, m'(i) becomes m"(i).

Decoding the Displacement Bitstream

To decode displacement bitstream, video decoder is followed by image unpacking, inverse quantization, and inverse wavelet transform to generate decoded displacement for vertices in the base mesh and middle points generated in the subdivision process. The decoded displacement and m"(i) are combined to form the decoded mesh denoted as M"(i)

Decoding the Attribute Bitstream

To decode attribute bitstream, and video decoder is employed followed color space conversion if needed In mesh codecs in related art, e.g., MPEG V-Mesh Test model, floating operations are utilized in variety of modules. As an example, floating operations are used in the subdivision model in static mesh decoder, in the inverse quantization, inverse wavelet transform, and application of displacement vector used in displacement decoding process. A person of skill in the art knows that the results for floating operations highly depend on the order of the operations and the underlying hardware platforms. It is often difficult to generate the same decoded mesh data if floating operations are included in the decoding process. In addition, decoded meshes may be used in the inter-frame decoding path. If the decoded meshes in the encoder side and in the decoder side are different, drifting artifacts can be observed if these meshes are used as reference meshes for future encoding and/or decoding.

Thus, it is desirable to use fix-point or integer operations for mesh coding, instead of those floating operations. Embodiments of the present disclosure relate to methods, systems, and devices for fixed-point implementation of a mesh codec.

In embodiments, person of skill in the art will understand that the V-Mesh decoder is used as an example and that the proposed methods can be extended to general mesh coding operations. The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

In this disclosure, a number of methods and systems are proposed for vertex position coding in mesh compression. A person of skill in the art would know that they can be applied individually or by any form of combinations. It should be also noted that the methods can be applied to not only dynamic meshes, but also static meshes, where there is only one frame of the mesh, or the mesh content does not change over time. Further, the disclosed methods and systems are not limited to vertex position coding. They can also be applied to, for example, 2D texture coordinate coding, as a more general multi-prediction-based scheme.

Fixed Point Implementation of Subdivision Process-Base Mesh Decoding

Normal Vector Generation

Figure 5A:
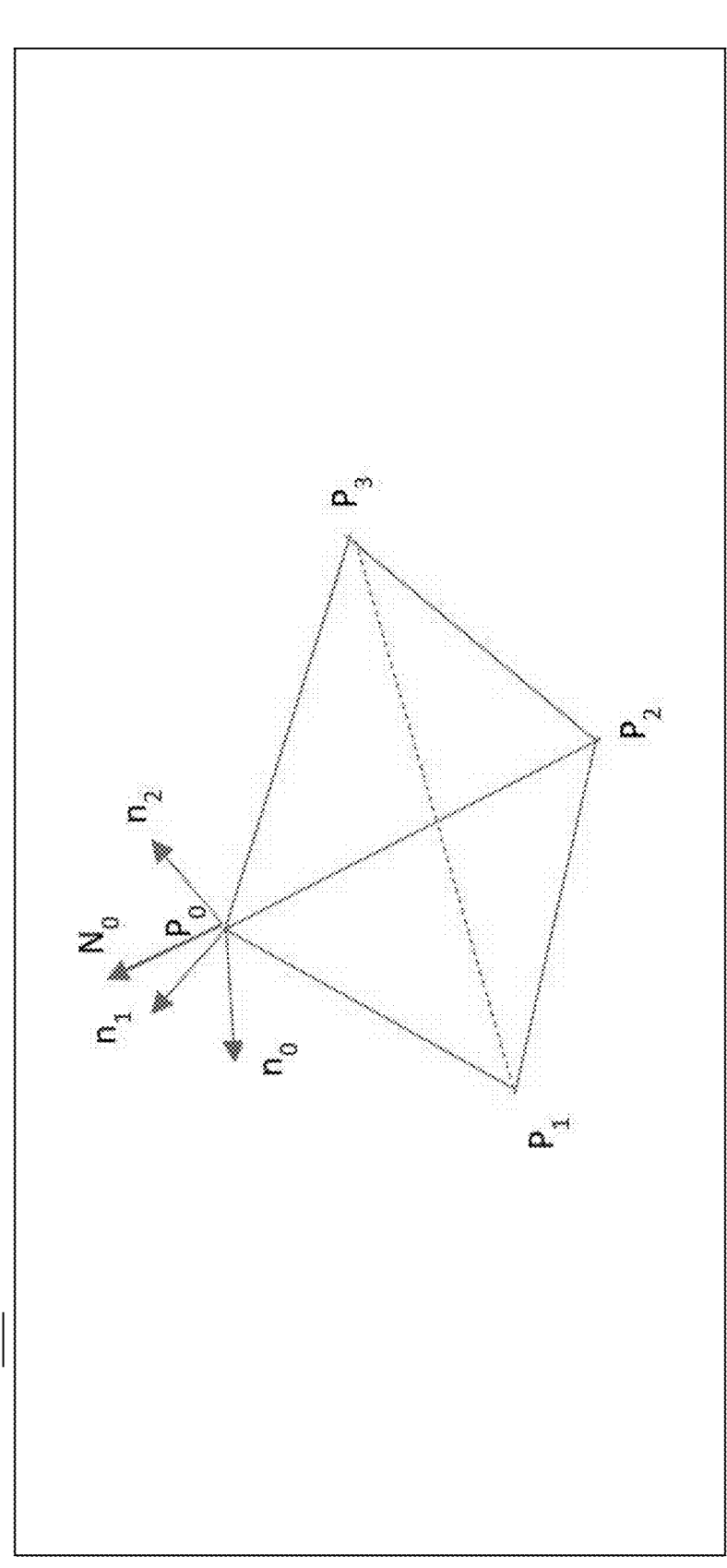
FIG. 5A is an exemplary illustration of a computation of a normal vector of a vertex, according to embodiments of the present disclosure.

Before the actual subdivision process, a normal vector is generated for each vertex in the decoded base mesh. In MPEG V-Mesh codec, area weighted normal vector is used. The process is illustrated in FIG. 5A.

The coordinates of point $P_i$ may be denoted as $(x_i, y_i, z_i)$. Using the tetrahedron in FIG. 5A as an example, the process to compute the normal vector of vertex $P_0$ may be as follows:

First, compute $n_0$, $n_1$ and $n_2$, which are the non-normalized normal vectors of triangles that are incident on the vertex $P_0$ (i.e., $P_0P_1P_2$, $P_0P_2P_3$, $P_0P_3P_1$), as follows:

$$n_0 = (P_1 - P_0) \times (P_2 - P_0) \qquad (1)$$

$$n_1 = (P_2 - P_0) \times (P_3 - P_0)$$

$$n_2 = (P_3 - P_0) \times (P_1 - P_0)$$

where X is the cross-product of two vectors.
Denotes $$N_0' = (x_0', y_0', z_0')$$

Second, accumulate the non-normalized normal vectors of triangles that are incident on the vertex $P_0$ to obtain the non-normalized normal vector of the vertex $P_0$, shown as follows:

$$N_0' = n_0 + n_1 + n_2 \qquad (2)$$

Then, obtain the normalized vertex normal vector as following:

$$N_0 = \left( \frac{x_0'}{\|N_0'\|}, \frac{y_0'}{\|N_0'\|}, \frac{z_0'}{\|N_0'\|} \right) \|N_0'\| = \sqrt{x_0' * x_0' + y_0' * y_0' + z_0' * z_0'} \qquad (3)$$

In the fixed-point implementation of the above algorithm, the components in $P_i = (x_i, y_i, z_i)$ may be represented as integer, which are obtained after decoding the mesh. Hence the Equation (1) and (2) are done naturally in integer operation.

Equation (3) requires computation of the inverse square root of a positive integer number. The Newton-Raphson method may be used to obtain approximation of the inverse square root value of a positive number x. Let $$y = \frac{1}{\sqrt{x}}, \text{Then, } x - \frac{1}{y^2} = 0.$$

A function $$f(y) = x - \frac{1}{y^2}$$

may be defined, ensuring that the solution to the equation f(y)=0 will be the inverse square root value, i.e., $$\frac{1}{\sqrt{x}}.$$

Based on Newton-Kaphson method, the following iterative method may be used to obtain a good approximation to the final solution to f(y)=0, shown as following:

$$y_{n+1} = y_n - \frac{f(y_n)}{f'(y_n)} = (3y_n - xy_n^3)/2 \qquad (4)$$

For a given value x and a good starting value $y_0$, the above iteration can converge in a few iterations. In practice, one or two iterations is used. Since the inverse square root of a positive integer is a fraction number, the results need to be represented using a fix-point number. In an embodiment of the disclosure, a fix-point number with a pre-defined number of binary digits, i.e., kInverseSqrtPrecision digits, may be used to represent the faction part of the inverse square root value of a positive integer.

In the same or another embodiment of this disclosure, the implementation of inverse square root of a positive integer, i.e., irsqrt(•) function, may be specified, e.g., at the end of the present disclosure. In such an implementation, kInverseSqrt-Precision=40. To accommodate different precision requirement, a right shift by a pre-defined number, i.e., kNormal-Shift, of binary digits may be used to reduce the precision of the square root value, KNormalShift is a non-negative integer that is less than kInverseSqrtPrecision.

Thus, the components of the normalized normal vector $$N_0 = \left( n_x^0, n_y^0, n_z^0 \right)$$

may be computed as following:

$$n_x^0 = \text{Shift}(x_0' * irsqrtNum, \text{bias}, kNormalShift) \qquad (5a)$$

$$n_y^0 = \text{Shift}(y_0' * irsqrtNum, \text{bias}, kNormalShift)$$

$$n_z^0 = \text{Shift}(z_0' * irsqrtNum, \text{bias}, kNormalShift)x$$

where the shift(x, bias, kShift) function may be defined as follows:

$$\text{Shift}(x, \text{bias}, kShift) = \begin{cases} (\text{bias} + x) \gg kShift, & \text{if } x \geq 0 \\ -((\text{bias} - x) \gg kShift), & \text{if } x < 0 \end{cases} \qquad (5b)$$

In Equation 5a, bias=1<<(KNormalShift−1) and irsqrt-Num may be defined as $$irsqrtNum = irsqrt(x_0' * x_0' + y_0' * y_0' + z_0' * z_0').$$

In an embodiment, bias may be set to 0 in Equation 5b, shown as follows:

$$\text{Shift}(x, 0, kShift) = \begin{cases} x \gg kShift, & \text{if } x \geq 0 \\ -((-x) \gg kShift), & \text{if } x < 0 \end{cases} \quad (5c)$$

In another embodiment, Equation 5c may be further simplified as follows:

$$\text{Shift}(x, 0, kShift) = x \gg kShift \quad (5d)$$

Thus $$\left(n_x^0, n_y^0, n_z^0\right)$$

are represented as kNormalPrecision=kInverseSqrtPrecision−KNormalShift number of digits. For example, if KNormalShift=16, then kNormalPrecision=24.

A person of skill in the art would know that implementation other than that disclosed herein can also be used. In embodiments, k3timesR and kRcubed are two example look-up tables. Variation of the implementations can be employed. For example, the lookup tables, k3timesR and kRcubed may have different precision other than kInverseSqrtPrecision=40 bits. Furthermore, their values may be different from those shown in the disclosure due to different ways of round operations when converting fraction numbers to integer numbers Middle Point Generation In a mesh codec such as MPEG V-Mesh codec, mid-point subdivision scheme is used to sub-divide the base mesh in order to recover details of original mesh after decimation process. In this process, an edge is split into two parts with equal length, show as FIG. 5B.

Figure 5B:
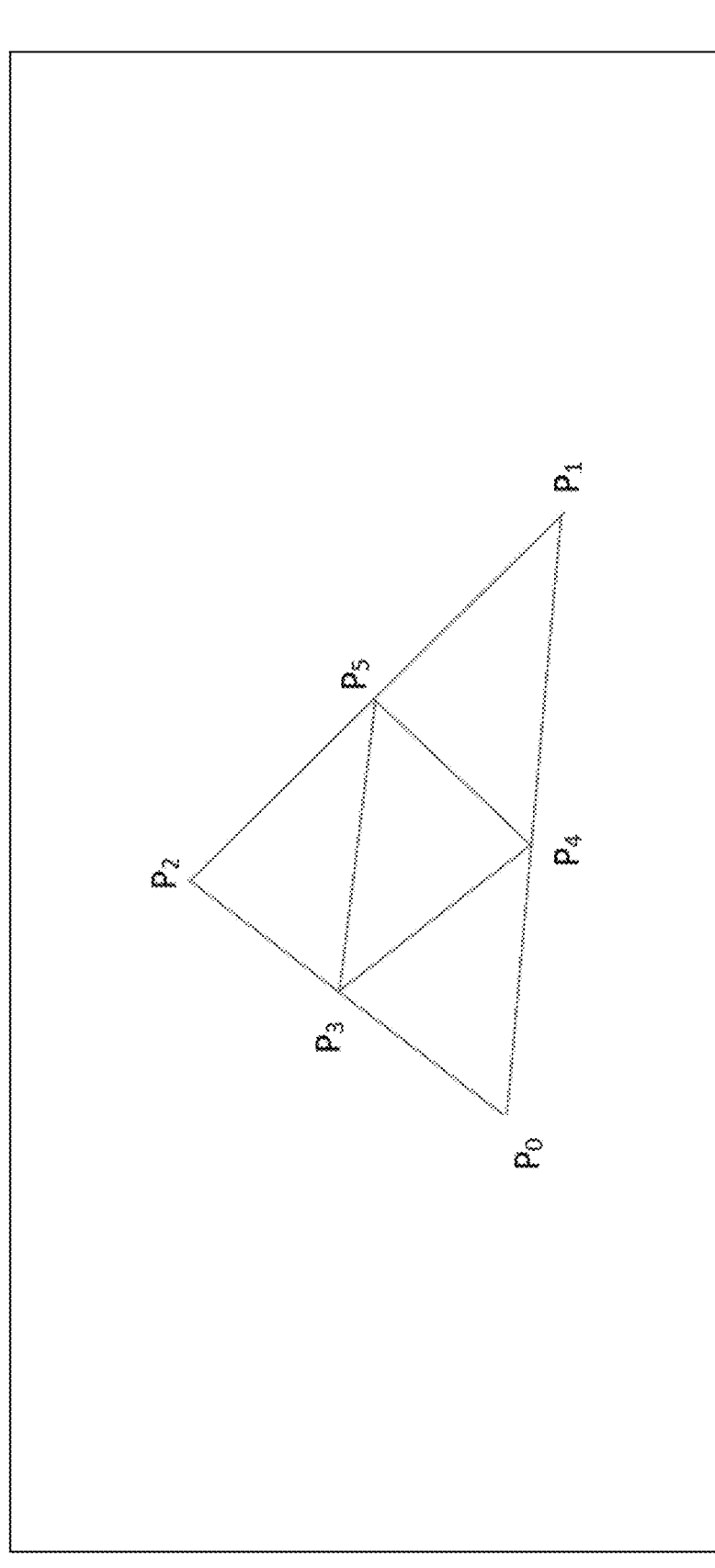
FIG. 5B is an exemplary illustration of a computation of a mid-edge subdivision scheme, according to embodiments of the present disclosure.

As shown in FIG. 5B, the original triangle is $P_0P_1P_2$. Point $P_3$, $P_4$ and $P_5$ are the middle point of edge $P_0P_2$, $P_0P_1$ and $P_1P_2$. In this way, the original triangle is sub-divided into 4 smaller triangles, i.e., $P_0P_4P_3$, $P_4P_5P_3$, $P_4P_1P_5$, $P_5P_2P_3$. Note that the mid-point subdivision process can be done in multiple iterations. For example, after one more subdivision iteration, the triangle in FIG. 5B will becomes 16 smaller triangles. In practice, 1-3 iterations are often used.

The coordinates of point $P_i$ may be denoted as $(x_i,y_i,z_i)$. Without loss of generality, the middle point $P_3$ is used as an example. Its coordinates can be computed in floating operation as following:

$$x_3 = 0.5 * (x_0 + x_2) \quad (6)$$
$$y_3 = 0.5 * (y_0 + y_2)$$
$$z_3 = 0.5 * (z_0 + z_2)$$

where $(x_i,y_i,z_i)$ are represented as single precision or double precision numbers.

In an embodiment of this disclosure, the coordinates of vertices in the base mesh, i.e., $(x_i,y_i,z_i)$, i=0, . . . , N−1 where N is the number of vertices in the base mesh, are represented as n-digit binary integer numbers, which are obtained after decoding of the base mesh. Before the sub-division process, those numbers are left-shifted by a pre-defined non-negative integer number of digits, for example, kCoordShift, to obtain numbers with higher precision as follows:

$$X_i = x_i \ll kCoordShift \quad (7)$$
$$Y_i = y_i \ll kCoordShift$$
$$Z_i = z_i \ll kCoordShift$$

For example, KCoordShift can be set as 4 or 8 depending on the required final precision and number of iterations in the subdivision process. If KCoordinateShift is set to 0, no left shift operation is needed.

Using the updated coordinates $(X_i,Y_i,Z_i)$, the middle point $P_3$ can be computed as follows:

$$X_3 = (X_0 + X_2 + 1) \gg 1 \quad (8)$$
$$Y_3 = (Y_0 + Y_2 + 1) \gg 1$$
$$Z_3 = (Z_0 + Z_2 + 1) \gg 1$$

In same or another embodiment, the bias 1 is omitted for simplicity, i.e., the middle point $P_3$ is computed as follows:

$$X_3 = (X_0 + X_2) \gg 1 \quad (9)$$
$$Y_3 = (Y_0 + Y_2) \gg 1$$
$$Z_3 = (Z_0 + Z_2) \gg 1$$

A person of skill in the art would know that the above middle point generation process also applies to the texture coordinate triangles to generate the corresponding subdivided texture coordinate triangles. The difference is that texture coordinates only have two components, compared to three components in vertex coordinates.

Computation of Normal Vectors for Middle Points

Figure 5C:
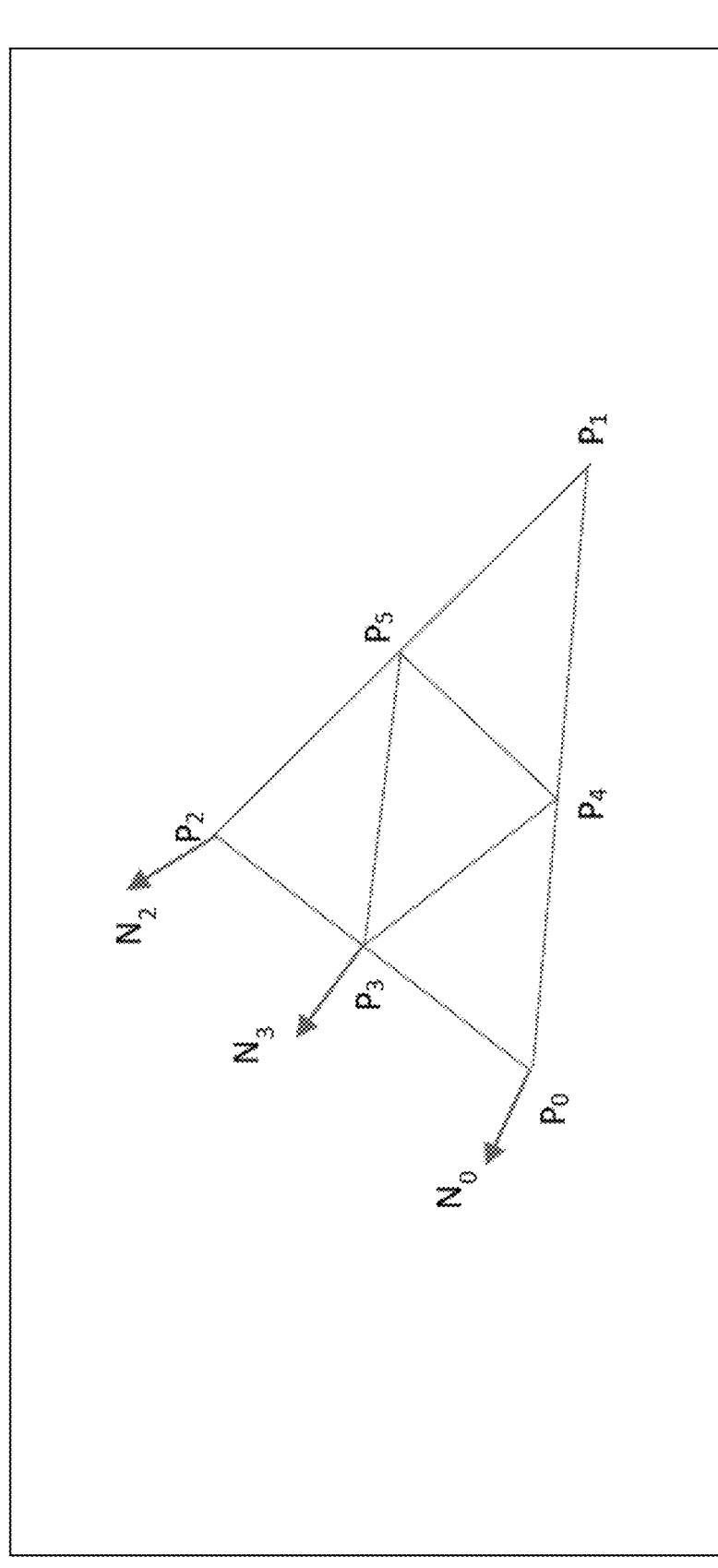
FIG. 5C is an exemplary illustration of a computation of a normal vector of middle points, according to embodiments of the present disclosure.

As shown above, middle points may be generated after one or more iteration of middle-point subdivision process. Interpolation is often used to obtain normal vectors of the middle points. For example, in FIG. 5C, $P_3$ is the middle point, its normal vector is computed as the average of the normal vectors of two end vertices in the same edge, i.e., $N_0$, $N_2$. The computation process is as follows:

$$m_x^3 = 0.5 * \left(n_x^0 + n_x^2\right) \quad (10)$$
$$m_y^3 = 0.5 * \left(n_y^0 + n_y^2\right)$$
$$m_z^0 = 0.5 * \left(n_z^0 + n_z^2\right)$$

Where $$N_0 = \left(n_x^0, n_y^0, n_z^0\right), N_2 = \left(n_x^2, n_y^2, n_z^2\right).$$

The vector $$\left(m_x^3, m_y^3, m_z^3\right)$$

is normalized to obtain the normalized normal vector $$N_3 = \left( n_x^3, n_y^3, n_z^3 \right).$$

In the fix-point implementation according to embodiments, the computation is shown as following:

$$m_x^3 = \left( n_x^0 + n_x^2 + 1 \right) \gg 1 \qquad (11)$$

$$m_y^3 = \left( n_y^0 + n_y^2 + 1 \right) \gg 1$$

$$m_z^0 = \left( n_z^0 + n_z^2 + 1 \right) \gg 1$$

$$irsqrtNum2 = irsqrt\left( m_x^3 * m_x^3 + m_y^3 * m_y^3 + m_z^3 * m_z^3 \right)$$

$$n_x^3 = shift\left( m_x^3 * irsqrtNum2, bias2, kNormalShift \right)$$

$$n_y^3 = shift\left( m_y^3 * irsqrtNum2, bias2, kNormalShift \right)$$

$$n_z^3 = shift\left( m_z^3 * irsqrtNum2, bias2, kNormalShift \right)$$

In this way, $$\left( n_x^3, n_y^3, n_z^3 \right)$$

are represented with KNormalPrecision number of digits, which is the same as other normalized normal vectors. In Equation 11, bias2=1<<(KNormalShift−1) and the function shift(x, bias, kShift) is defined in Equation 5b . . . . In an embodiment, bias2 is set to 0 for simplicity, as shown in Equation 5c or 5d.

In another embodiment, the bias 1 and right shift operation can be omitted, shown as follows:

$$m_x^0 = n_x^0 + n_x^2 \qquad (12)$$

$$m_y^0 = n_y^0 + n_y^2$$

$$m_z^0 = n_z^0 + n_z^2$$

In the same or another embodiment, only the bias 1 is omitted in Equation 11

In case $$\left( m_x^3, m_y^3, m_z^3 \right) = (0, 0, 0)$$

after computation in Equation 11 or 12, normalization process cannot be done since "division by zero" will occur. Instead, $$N_3 = \left( n_x^3, n_y^3, n_z^3 \right) = (0, 0, 0)$$

can be set without going through the normalization process as shown in Equation (11). Note that (0,0,0) may not be a valid normal vector for certain applications.

In another embodiment, $$\left( n_x^3, n_y^3, n_z^3 \right)$$

may be set to a predefined normal vector, for example, $$N_3 = \left( n_x^3, n_y^3, n_z^3 \right) = \left( 1 \ll KNormalPrecision, 0, 0 \right) \text{ or } N_3 =$$

$$\left( n_x^3, n_y^3, n_z^3 \right) = \left( 0, 1 \ll KNormalPrecision, 0 \right) \text{ or } N_3 =$$

$$\left( n_x^3, n_y^3, n_z^3 \right) = \left( 0, 1 \ll KNormalPrecision, 0 \right).$$

Thus, the normal vector may be valid for all applications and may benefit the displacement process In the same or another embodiment, in case $$\left( m_x^3, m_y^3, m_z^3 \right) = (0, 0, 0),$$

$N_3$ can be set to be the same as one of the normal vectors of the two end vertices, i.e., $N_3 = N_0$ or $N_3 = N_2$. Some heuristic rule may be used to make the decision, for example, in case the average of the normal vectors of two end vertices is all-zero vector, the normal vector of the middle point is set to the normal vector of the end vertices with smaller index, i.e., $N_3 = N_0$. If instead the normal vector of the middle point is set to the normal vector of the end vertices with larger index, thus $N_3 = N_2$.

Fixed Point Implementation of Displacement Coding

Figure 6A:
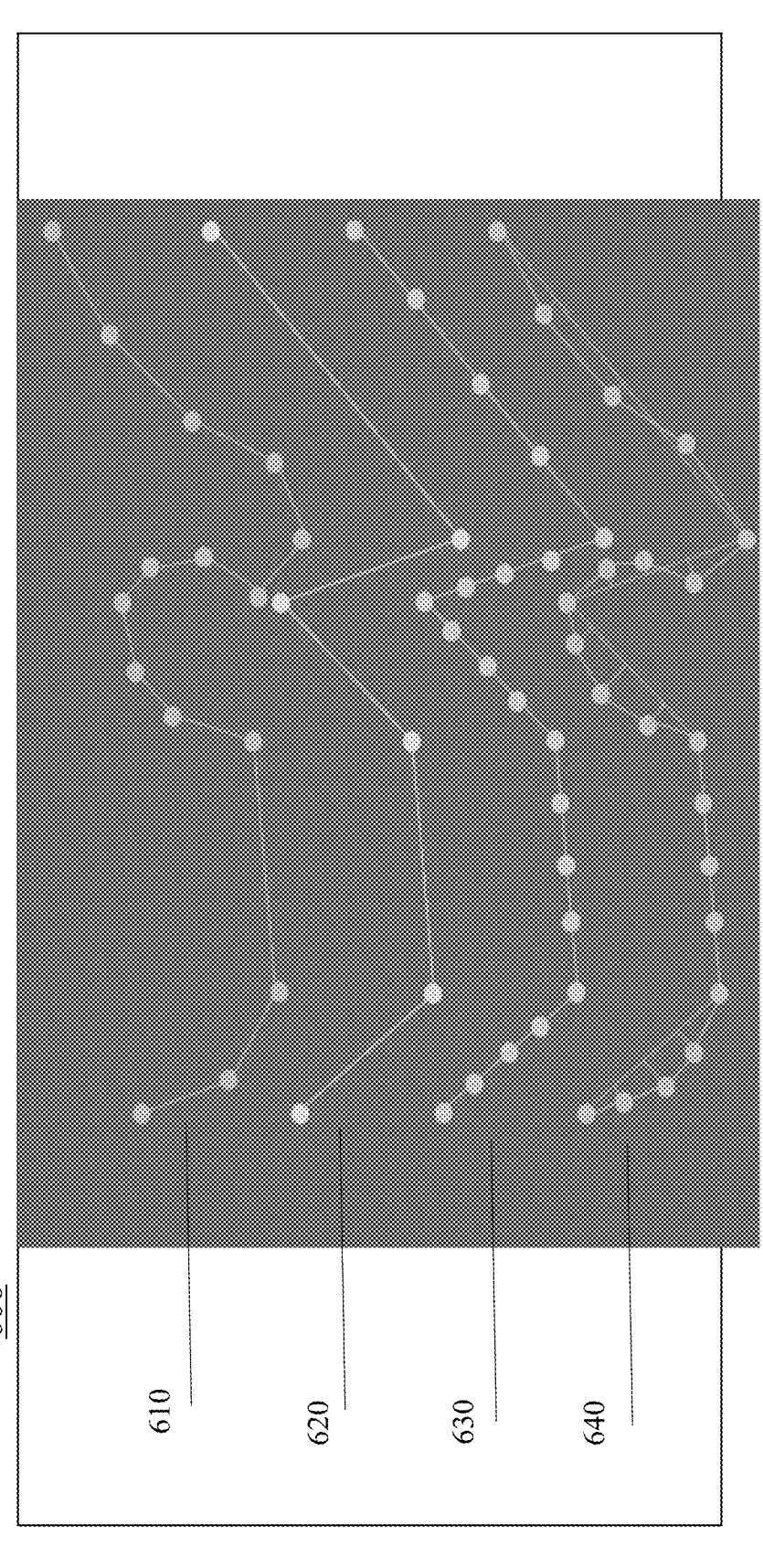
FIG. 6A is an exemplary illustration of displacement vector using a two-dimensional (2D) curve, in accordance with embodiments of the present disclosure.]

FIG. 6A illustrates an example diagram 600 of the computations involved in displacement vector generation. In a mesh codec, displacement vectors 640 are computed for vertices of the subdivided mesh 630 so that the shape of the displaced mesh closely match the shape of the original mesh 610 before mesh decimation and subdivision process generates decimated vectors 620.

In embodiments, after displacement vectors are obtained, they are converted using local coordinate system of a vertex in which three basis vectors are the normal vector of the vertex, its tangent vector and its bi-tangent vector. The converted displacement vectors are then transformed using wavelet transform with lifting followed by quantization process. The quantized wavelet coefficients are then coded either using a video coder or a special designed entropy coder. The reverse operations are carried out in the decoder, which will be described below.

Dequantization of Quantized Wavelet Coefficients

The decoded quantized wavelet coefficients for vertex $P_i$ may be denoted as $$W_i = \left( w_n^i, w_t^i, w_b^i \right)$$

where $$w_n^i, w_t^i, w_b^i$$

are the components in the normal, tangent, and bi-tangent direction, respectively.

In a codec, the dequantization process may be shown as follows:

US 12,639,859 B2

13

$$iscale = 2.0^{bitDepthPosition-16+\frac{(qp-4)}{6.0}} \quad (13a)$$

$$\overline{w}_n^i = w_n^i * iscale$$

$$\overline{w}_t^i = w_t^i * iscale$$

$$\overline{w}_b^i = w_b^i * iscale$$

Where $$\overline{W}_i = \left(\overline{w}_n^i, \overline{w}_t^i, \overline{w}_b^i\right)$$

is the dequantized wavelet coefficients, qp is the quantization parameter used in the encoder and sent in the bitstream, and bitDepthPosition is the bit depth of the vertex coordinates in the original base mesh. Note that iscale is the inverse scaling factor for displacement vectors that corresponds to the vertices at base mesh, i.e., at the 0-th sub-division iteration.

For displacement vectors that corresponds to middle points generated at the k-th sub-division iteration process, the inverse scaling factor is shown as following:

$$iscale = 2.0^{bitDepthPosition-16+k+\frac{(qp-4)}{6.0}} \quad (13b)$$

According to an embodiment of the present disclosure, the fix-point implementation of the dequantization process may be as follows:

First, a lookup table may be created, shown as follows:

$$LUT[qp] = \text{floor}\left(2.0^{\frac{(qp-4)}{6.0}} * (1 \ll kDequantShift)\right) \quad (14)$$

for qp=0, 1, 2, 3, 4, 5, where floor(x) is a function returning the largest integer that is no greater than x.

In the same or another embodiment, the lookup table may be modified slightly as follows:

$$LUT[qp] = \text{floor}\left(2.0^{\frac{(qp-4)}{6.0}} * (1 \ll kDequantShift) + 0.5\right) \quad (15)$$

Note that kDequantShift is the parameter to control the precision of the lookup table, hence the dequantized coefficients. For example, given kDequantShift=10, the lookup table using Equation 15 is shown as LUT[6]=[645, 724, 813, 912, 1024, 1149]

Second, the dequantized coefficients are computed as follows:

$$qpShift = \text{floor}\left(\frac{qp}{6}\right) + bitdepthPosition - 16 \quad (16)$$

$$qpScale = \begin{cases} LUT[qp \% 6] \ll qpShift & \text{if } qpShift \geq 0 \\ LUT[qp \% 6] \gg (-qpShift) & \text{if } qpShift < 0 \end{cases}$$

$$\overline{w}_n^i = w_n^i * qpScale$$

$$\overline{w}_t^i = w_t^i * qpScale$$

$$\overline{w}_b^i = w_b^i * qpScale$$

Where % is the modulo operation.

In the same or another embodiment, bias is used in computing qpScale, shown as $$qpScale = \quad (18a)$$
$$\begin{cases} LUT[qp\%6] \ll qpShift & \text{if } qpShift \geq 0 \\ (LUT[qp\%6] + (1 \ll (-qpShift - 1))) \gg (-qpShift) & \text{if } qpShift < 0 \end{cases}$$

Note that qpShift is the shift factor for displacement vectors in the base mesh. The shift factor for displacement vectors corresponds to the middle points generated at the k-th sub-division iteration process is shown as follows:

$$qpShift = \text{floor}\left(\frac{qp}{6}\right) + bitdepthPosition - 16 + k \quad (18b)$$

Inverse Wavelet Transform With Lifting

In the encoder, assume K subdivision iterations are done. Before any subdivision, the vertices in the base mesh are called vertices in $LOD_0$; after the first subdivision, the generated middle points in the subdivision are called vertices in LOD1; similarly, the generated middle points in the k-th subdivision are called vertices in $LOD_k$. In the encoder, Predction/Update steps are done for each LOD level, starting from $LOD_K$ to $LOD_1$.

Figure 6B:
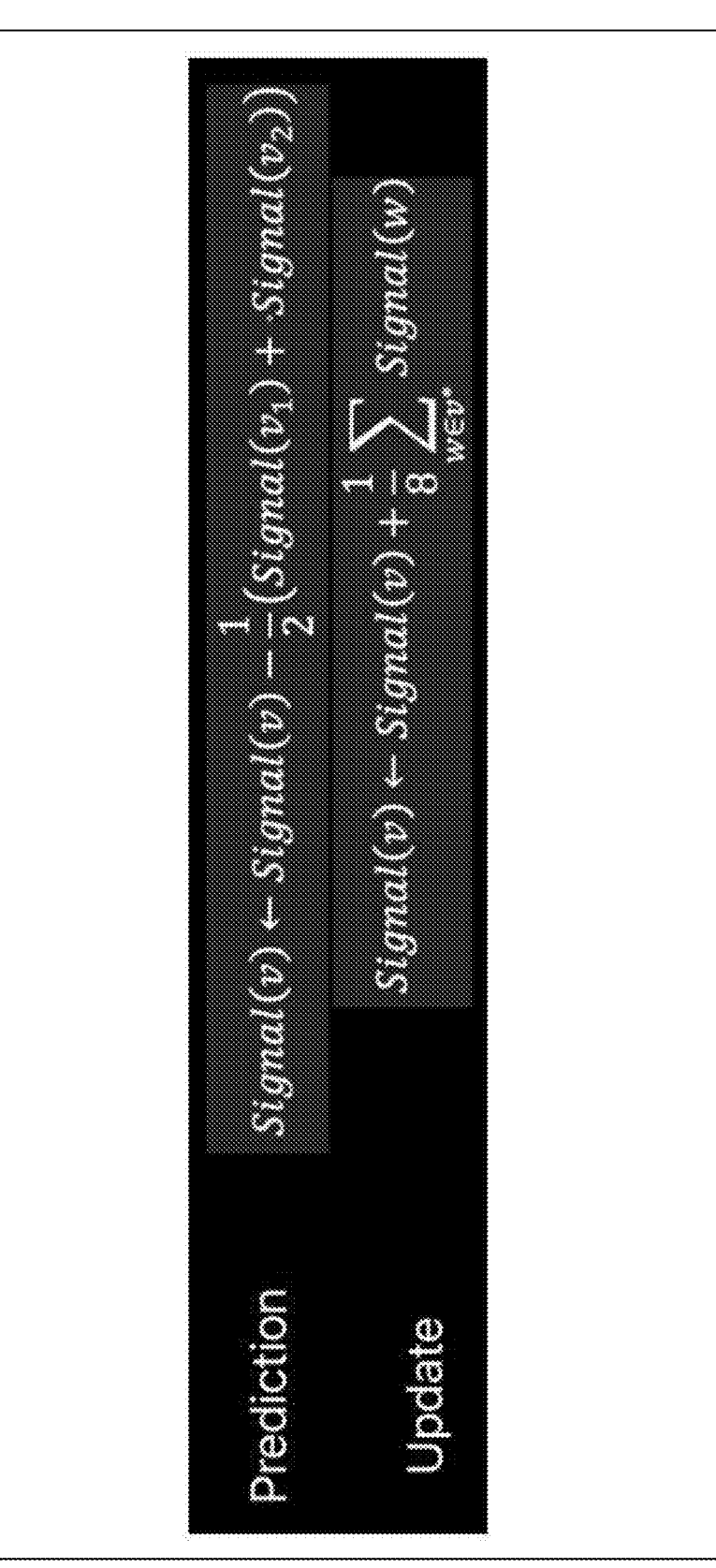
FIG. 6B is an exemplary illustration of a prediction step and an update step in a wavelet transform function, in accordance with embodiments of the present disclosure.

FIG. 6B illustrates exemplary formulae for wavelet transform with lifting to transform the displacement vector in the encoder.

As shown in FIG. 6B, in the Prediction step, v is a vertex in $LOD_k$, v1 and v2 are the two end vertices which are in LOD level lower than k, Signal(v), Signal(v1) and Signal (v2) on the right side of the arrow are the displacement vector, Signal(v) on the left side is the displacement residual. In the Update step, v is a vertex in LOD level lower than k, v* are the set of middle points in LOD; that are immediate neighbors of vertex v, on the right side of the arrow, Signal(w) are the displacement residual, Signal(v) is the displacement vector. On the left side, Signal(v) is the updated displacement vector for vertex v.

This process is reversed in the decoder. The inverse wavelet transform is carried for $LOD_1$ first, followed by $LOD_2, \ldots, LOD_K$ where K is the number of sub-division iterations. Without loss of generality, $LOD_1$ is used as an example. At $LOD_1$ the update process is done first.

For a vertex v in $LOD_0$, i.e., in base mesh, the corresponding displacement vector is updated as following:

$$\overline{w}_n^v = \overline{w}_n^v - \sum_{w \in v^*} \overline{w}_n^w * 0.125 \quad (19)$$

$$\overline{w}_t^v = \overline{w}_t^v - \sum_{w \in v^*} \overline{w}_t^w * 0.125$$

$$\overline{w}_b^v = \overline{w}_b^v - \sum_{w \in v^*} \overline{w}_b^w * 0.125$$

where v* is the set of points in $LOD_1$ that are immediate neighbors of vertex v.

For a vertex w in $LOD_1$, its displacement vector is modified as following:

$$\overline{w}_n^w = 0.5 * \left(\overline{w}_n^{v1} + \overline{w}_n^{v2}\right) \quad (20)$$

-continued $$\bar{w}_b^w = 0.5 * \left(\bar{w}_b^{v1} + \bar{w}_t^{v2}\right)$$

$$\bar{w}_t^w = 0.5 * \left(\bar{w}_t^{v1} + \bar{w}_b^{v2}\right)$$

where v1, v2 are the two end points in $LOD_0$ for the middle point w in $LOD_1$.

According to embodiments of the present disclosure, the fix-point implementation may be as follows For a vertex v in $LOD_0$, i.e., in base mesh, the corresponding displacement vector is updated as following:

$$\bar{w}_n^v = \bar{w}_n^v - \sum_{w \in v^*} \text{shift}(\bar{w}_n^w, 4, 3) \qquad (21)$$

$$\bar{w}_t^v = \bar{w}_t^v - \sum_{w \in v^*} \text{Shift}(\bar{w}_t^w, 4, 3)$$

$$\bar{w}_b^v = \bar{w}_b^v - \sum_{w \in v^*} \text{Shift}(\bar{w}_t^w, 4, 3)$$

Note that the Shift(x, bias, kShift) function is defined in Equation 5b. In another embodiment, bias is set to 0 and Equation 5c is employed. In yet another embodiment, bias is set to 0 and Equation 5d is adopted.

For a vertex w in $LOD_1$, its displacement vector is modified as following:

$$\bar{w}_n^w = \text{Shift}\left(\bar{w}_n^{v1} + \bar{w}_n^{v2}, 1, 1\right) \qquad (22)$$

$$\bar{w}_b^w = \text{Shift}\left(\bar{w}_b^{v1} + \bar{w}_t^{v2}, 1, 1\right)$$

$$\bar{w}_t^w = \text{Shift}\left(\bar{w}_t^w + \bar{w}_b^{v2}, 1, 1\right)$$

Similarly, Shift(x, bias, kShift) function is defined in Equation 5b. In another embodiment, bias is set to 0 and Equation 5c is employed. In yet another embodiment, bias is set to 0 and Equation 5d is adopted.

After the inverse wavelet transform, the displacement vector $$D_i = \left(d_n^i, d_t^i, d_b^i\right)$$

is obtained for i=0, 1, . . . , N−1 where N is the number of vertices in the subdivided mesh.

Application of Displacement Vectors

Given the coordinates for vertex $P_i=(x_j,y_i,z_i)$ and the displacement vector $$D_i = \left(d_n^i, d_t^i, d_b^i\right),$$

the coordinates of vertices can be obtained using:

$$\bar{x}_i = x_i + d_n^i * n_x^i + d_t^i * t_x^i + d_b^i * b_x^i \qquad (23)$$

$$\bar{y}_i = y_i + d_n^i * n_y^i + d_t^i * t_y^i + d_b^i * b_y^i$$

$$\bar{z}_i = x_i + d_n^i * n_z^i + d_t^i * t_z^i + d_b^i * b_z^i$$

Where $$N_i = \left(n_x^i, n_y^i, n_z^i\right), T_i = \left(t_x^i, t_y^i, t_z^i\right), B_i = \left(b_x^i, b_y^i, b_z^i\right)$$

are the normal vector, tangent vector and bi-tangent vector for vertex $P_i$. Note that $N_i$ is computed in previous section. $T_i$ and $B_i$ are computed as follows:

First define the canonical Cartesian basis vector $e_x=(1.0, 0,0)$, $e_y=(0,1.0,0)$, $e_z=(0,0,1.0)$. The tangent vector $$T_i = \left(t_x^i, t_y^i, t_z^i\right)$$

is computed as follows:

$$T_i' = \begin{cases} e_x - n_x^i * N_i, & \text{if } |n_x^i| \le |n_y^i| \text{ and } |n_x^i| \le |n_z^i| \\ e_y - n_y^i * N_i, & \text{else if } |n_y^i| \le |n_z^i| \\ e_z - n_z^i * N_i, & \text{else} \end{cases} \quad T_i = \frac{T_i'}{\|T_i'\|} \qquad (24)$$

Where |x| denotes the absolution value of a scale x and $$\|T_i'\|$$

is the Euclidean norm of vector $$T_i'.$$

The bi-tangent vector $$B_i = \left(b_x^i, b_y^i, b_z^i\right)$$

is computed as follows:

$$B_i = N_i \times T_i \qquad (25)$$

Where x denotes the cross-product of two vectors

For fixed point implementation of Equation (23), the precision of $P_i$ is kCoordShift, i.e., it has kCoordShift fraction bits, as shown in Equation (7); the precision of $D_i$ is kDequantShift, as shown in Equation (14) and (15); the precision of $N_i$, $T_i$ and $B_i$ is kNoramPrecision.

Let kNumShift=kDequantShift−kCoordShift+kNoramPrecision and assume it is greater than 0. Denote bias3=1<< (kNumShift−1). The fix-point implementation of Equation (23) is shown as follows:

$$\bar{x}_i = x_i + \text{Shift}\left(d_n^i * n_x^i + d_t^i * t_x^i + d_b^i * b_x^i, bias3, KNumShift\right) \qquad (26)$$

$$\bar{y}_i = y_i + \text{Shift}\left(d_n^i * n_y^i + d_t^i * t_y^i + d_b^i * b_y^i, bias3, KNumShift\right)$$

$$\bar{z}_i = x_i + \text{Shift}\left(d_n^i * n_z^i + d_t^i * t_z^i + d_b^i * b_z^i, bias3, KNumShift\right)$$

where the function Shift(x, bias3,kNumShift) is defined in Equation 5b. In another embodiment, bias3 is set to 0 and Equation 5c is employed. In yet another embodiment, bias3 is set to 0 and Equation 5d is adopted. In one embodiment of this invention, the shift operation is done after each multiplication operation, shown as follows:

$$\bar{x}_i = x_i + \text{Shift}(d_n^i * n_x^i, bias3, KNumShift) + \quad (27)$$
$$\text{Shift}(d_t^i * t_x^i, bias3, KNumShift) + \text{Shift}(d_b^i * b_x^i, bias3, KNumShift)$$
$$\bar{y}_i = y_i + \text{Shift}(d_n^i * n_y^i, bias3, KNumShift) +$$
$$\text{Shift}(d_t^i * t_y^i, bias3, KNumShift) + \text{Shift}(d_b^i * b_y^i, bias3, KNumShift)$$
$$\bar{z}_i = z_i + \text{Shift}(d_n^i * n_z^i, bias3, KNumShift) +$$
$$\text{Shift}(d_t^i * t_z^i, bias3, KNumShift) + \text{Shift}(d_b^i * b_z^i, bias3, KNumShift)$$

Note that the definition of Shift(x,bias3,kNumShift) is the same as that in Equation 26.

The fixed implementation of Equation 24 is as follows:

$$\text{If } |n_x^i| \le |n_y^i| \text{ and } |n_x^i| \le |n_z^i|, \quad (28)$$
$$t_x^{i'} = \text{ONE} - \text{Shift}(n_x^i * n_x^i, bias4, kNormalPrecision)$$
$$t_y^{i'} = -\text{Shift}(n_x^i * n_y^i, bias4, kNormalPrecision)$$
$$t_x^{i'} = -\text{Shift}(n_x^i * n_z^i, bias4, kNormalPrecision)$$
$$\text{Else if } |n_y^i| \le |n_z^i|, \quad (29)$$
$$t_x^{i'} = -\text{Shift}(n_y^i * n_x^i, bias4, kNormalPrecision)$$
$$t_y^{i'} = \text{ONE} - \text{Shift}(n_y^i * n_y^i, bias4, kNormalPrecision)$$
$$t_x^{i'} = -\text{Shift}(n_y^i * n_z^i, bias4, kNormalPrecision)$$
$$\text{Else,} \quad (30)$$
$$t_x^{i'} = -\text{Shift}(n_z^i * n_x^i, bias4, kNormalPrecision)$$
$$t_y^{i'} = -\text{Shift}(n_z^i * n_y^i, bias4, kNormalPrecision)$$
$$t_x^{i'} = \text{ONE} - \text{Shift}(n_z^i * n_z^i, bias4, kNormalPrecision)$$

Where Shift(x, bias4, kNormalPrecision) is defined in Equation 5b. In another embodiment, bias4 is set to 0 and Equation 5c is employed. In yet another embodiment, bias4 is set to 0 and Equation 5d is adopted The vector $$T_i' = (t_x^{i'}, t_y^{i'}, t_z^{i'})$$

is normalized following the approach in Equation 5, shown as follows:

$$t_x^i = \text{Shift}(t_x^{i'} * irsqrtNum2, bias5, kNormalShift) \quad (31)$$
$$t_y^i = \text{Shift}(t_y^{i'} * irsqrtNum2, bias5, kNormalShift)$$
$$t_z^i = \text{Shift}(t_z^{i'} * irsqrtNum2, bias5, kNormalShift)x$$

Where bias5=1<<(KNormalShift−1) and irsqrtNum2 is defined as $$irsqrtNum = irsqrt(t_x^{i'} * t_x^{i'} + t_y^{i'} * t_y^{i'} + t_z^{i'} * t_z^{i'}).$$

The function Shift(x, bias5, KNormalShift) is defined in Equation 5b. In another embodiment, bias5 is set to 0 and Equation 5c is employed. In yet another embodiment, bias5 is set to 0 and Equation 5d is adopted.

The fix-point implementation of Equation 25 is as follows:

$$b_x^i = \text{Shift}(n_y^i * t_z^i - n_z^i * t_y^i, bias4, kNormalPrecision) \quad (32)$$
$$b_y^i = \text{Shift}(n_z^i * t_x^i - n_x^i * t_z^i, bias4, kNormalPrecision)$$
$$b_z^i = \text{Shift}(n_x^i * t_y^i - n_y^i * t_x^i, bias4, kNormalPrecision)$$

Where Shift(x, bias4, kNormalPrecision) is defined in Equation 5b. In another embodiment, bias4 is set to 0 and Equation 5c is employed. In yet another embodiment, bias4 is set to 0 and Equation 5d is adopted As stated above, software implementation of some of the functions disclosed herein may be as follows.

software implementation of inverse square root of a non-negative integer:

```
namespace rsqrt {
  static const uint64_t k3timesR[96] D= {
    3196059648, 3145728000, 3107979264, 3057647616, 3019898880, 2969567232,
    2931818496, 2894069760, 2868903936, 2831155200, 2793406464, 2768240640,
    2730491904, 2705326080, 2667577344, 2642411520, 2617245696, 2592079872,
    2566914048, 2541748224, 2516582400, 2491416576, 2466250752, 2441084928,
    2428502016, 2403336192, 2378170368, 2365587456, 2340421632, 2327838720,
    2302672896, 2290089984, 2264924160, 2252341248, 2239758336, 2214592512,
    2202009600, 2189426688, 2164260864, 2151677952, 2139095040, 2126512128,
    2113929216, 2101346304, 2088763392, 2076180480, 2051014656, 2038431744,
    2025848832, 2013265920, 2000683008, 2000683008, 1988100096, 1962934272,
    1962934272, 1950351360, 1937768448, 1925185536, 1912602624, 1900019712,
    1900019712, 1887436800, 1874853888, 1862270976, 1849688064, 1849688064,
    1837105152, 1824522240, 1811939328, 1811939328, 1799356416, 1786773504,
    1786773504, 1774190592, 1761607680, 1761607680, 1749024768, 1736441856,
    1736441856, 1723858944, 1723858944, 1711276032, 1698693120, 1698693120,
    1686110208, 1686110208, 1673527296, 1660944384, 1660944384, 1648361472,
    1648361472, 1635778560, 1635778560, 1623195648, 1623195648, 1610612736};
  static const uint64_t kRcubed[96] = {
    4195081216, 3999986688, 3857709056, 3673323520, 3538940928, 3364924416,
    3238224896, 3114735616, 3034196992, 2915990528, 2800922624, 2725880832,
    2615890944, 2544223232, 2439185408, 2370818048, 2303728640, 2237913088,
    2173355008, 2110061568, 2048008192, 1987165184, 1927563264, 1869150208,
```

-continued

```
    1840392192, 1783783424, 1728321536, 1701024768, 1647311872, 1620883456,
    1568898048, 1543306240, 1492993024, 1468236800, 1443762176, 1395656704,
    1372007424, 1348605952, 1302626304, 1280060416, 1257736192, 1235650560,
    1213861888, 1192294400, 1171008512, 1149979648, 1108673536, 1088379904,
    1068352512, 1048567808, 1029031936, 1029036032, 1009729536, 971888640,
    971882496, 953319424, 934993920, 916897792, 899011584, 881389568,
    881392640, 864009216, 846846976, 829900800, 813182976, 813201408,
    796721152, 780459008, 764412928, 764417024, 748601344, 732995584,
    733017088, 717624320, 702468096, 702466048, 687520768, 672786432,
    672787456, 658258944, 658256896, 643947520, 629854208, 629862400,
    615976960, 615952384, 602276864, 588779520, 588804096, 575512576,
    575526912, 562433024, 562439168, 549556224, 549564416, 536876032};
} // namespace rsqrt
uint64_t
irsqrt(uint64_t a64)
{
  using namespace rsqrt;
  if (!a64)
    return 0;
  int shift = -3;
  while (a64 & 0xffffffff00000000) {
    a64 >>= 2;
    shift--;
  }
  uint32_t a = a64;
  while (!(a & 0xc0000000)) {
    a <<= 2;
    shift++;
  }
  // initial approximation and first fixed point iteration:
  // r' = (3r-ar^3)/2 (divide by 2 will by handled by shifts)
  int idx = (a >> 25) - 32;
  uint64_t r = k3timesR[idx] - ((kRcubed[idx] * a) >> 32);
  // second fixed point iteration
  uint64_t ar = (r * a) >> 32;
  uint64_t s = 0x30000000 - ((r * ar) >> 32);
  r= (r * s) >> 32;
  // denormalize
  if (shift > 0)
    return r << shift;
  else
    return r >> -shift;
}
```

FIG. 7 is an exemplary process 700 for mesh decoding according to an embodiment.

At operation 705, from a coded bitstream, two vertices associated with an encoded mesh may be obtained. In embodiments, at least 2 vertices may be obtained. As an example, the components in $P_i=(x_i,y_i,z_i)$ may be represented as integer.

At operation 710, a first normal vector associated with a first vertex and a second normal vector associated with a second vertex may be determined. In embodiments, the components of the first normal vector and the second normal vector are integers.

At operation 715, a first normalized normal vector based on the first normal vector and a second normalized normal vector based on the second normal vector using an inverse square root function may be determined. In embodiments, a normalized normal vector may be determined using a combination of a fix-point number with a first pre-defined number of digits, a right-shift operation by a second pre-defined number, and the components of the respective normal vector.

At operation 720, a middle normalized normal vector associated with a middle-point may be determined. In embodiments, the middle normalized normal vector may be determined using the combination of the fix-point number with the first pre-defined number of digits, the right-shift operation by the second pre-defined number, and the components of the middle-point. In same or other embodiments, the components of the middle-point are determined based on a combination of the components of the first normal vector and the second normal vector and the right-shift operation by a third pre-defined number.

At operation 725, the encoded mesh may be decoded based on the first normalized normal vector, the second normalized normal vector, and the middle normalized normal vector.

According to embodiments, the fix-point number may be used to represent a fractional part of the normalized normal vector. According to embodiments, the two vertices may have integer components. In embodiments, the process may further include determining higher precision integer components for the two vertices based on a left-shift operation by a fourth pre-defined number. In some embodiments, the first normalized normal vector and the second normalized normal vector may be determined based on the higher precision integer components. In embodiments, the components of the middle-point may also determined based on higher precision integer components for the two vertices. In embodiments, the middle normalized normal vector may be determined based on higher precision integer components for the two vertices.

The proposed methods may be used separately or combined in any order. In embodiments, the encoding and decoding process may be reverse of each other. A person of skill in the art could change the order of the operations during decoding or encoding. The proposed methods may be used for arbitrary polygon mesh, but even though only a triangle mesh may have been used for demonstration of various embodiments. As noted above, it will be assumed that an input mesh may contain one or multiple instances, that a sub-mesh is a part of input mesh with an instance or multiple instance, and that multiple instances can be grouped to form a sub-mesh.

The techniques described above, can be implemented as computer software using computer-readable instructions and physically stored in one or more computer-readable media or by a specifically configured one or more hardware processors. For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
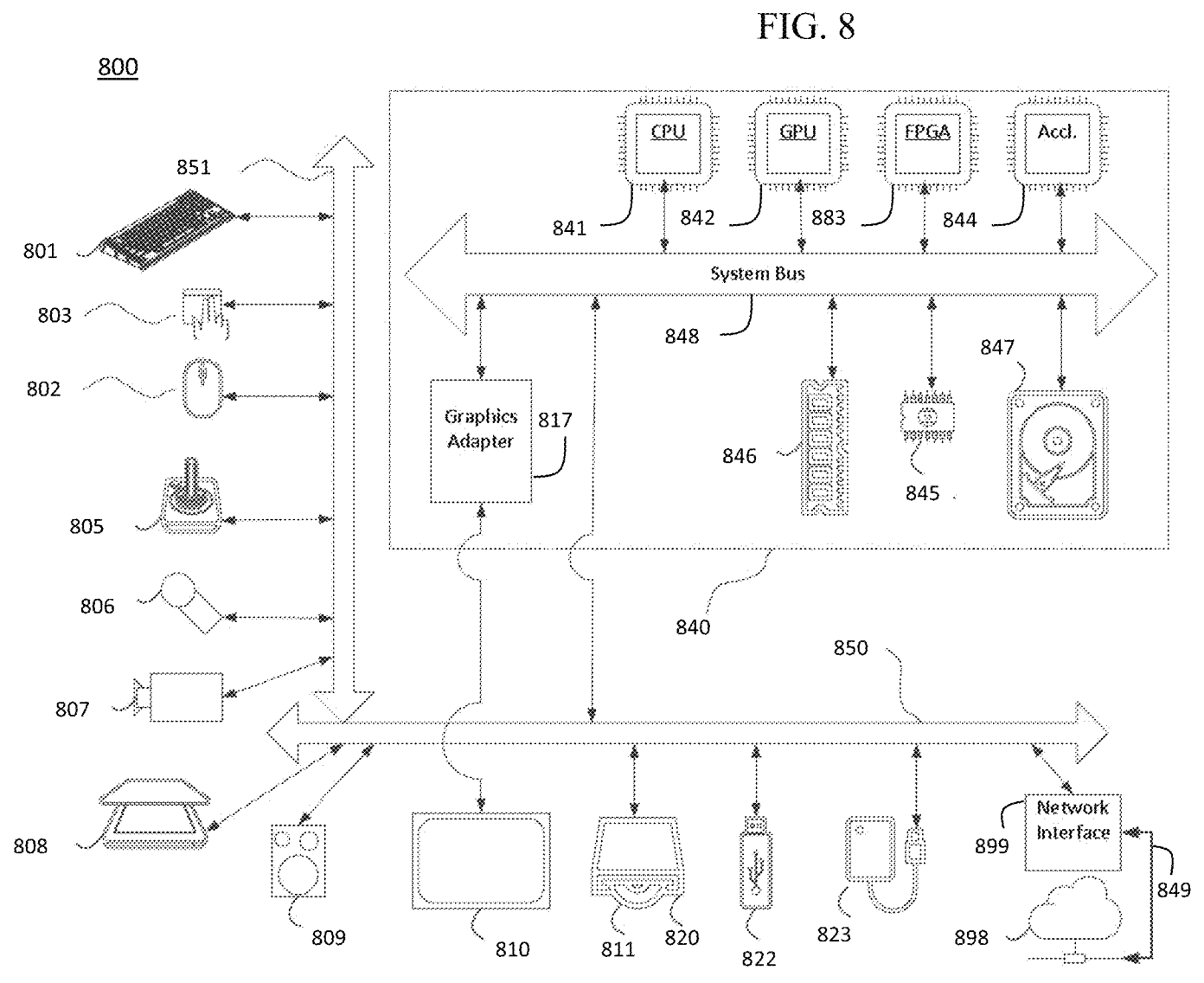

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, joystick 805, microphone 806, scanner 808, camera 807.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, or joystick 805, but there can also be tactile feedback devices that do not serve as input devices), audio output devices (such as: speakers 809, headphones (not depicted)), visual output devices (such as screens 810 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 800 can also include human accessible storage devices and their associated media such as optical media including CD/DVD ROM/RW 820 with CD/DVD 811 or the like media, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include interface 899 to one or more communication networks 898. Networks 898 can for example be wireless, wireline, optical. Networks 898 can further be local, wide-area, metropolitan, vehicular and industrial, real-time, delay-tolerant, and so on. Examples of networks 898 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 898 commonly require external network interface adapters that attached to certain general-purpose data ports or peripheral buses (750 and 851) (such as, for example USB ports of the computer system 800; others are commonly integrated into the core of the computer system 800 by attachment to a system bus as described below (for example Ethernet interface into a PC computer system or cellular network interface into a smartphone computer system). Using any of these networks 898, computer system 800 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 840 of the computer system 800.

The core 840 can include one or more Central Processing Units (CPU) 841, Graphics Processing Units (GPU) 842, a graphics adapter 817, specialized programmable processing units in the form of Field Programmable Gate Areas (FPGA) 843, hardware accelerators for certain tasks 844, and so forth. These devices, along with Read-only memory (ROM) 845, Random-access memory 846, internal mass storage such as internal non-user accessible hard drives, SSDs, and the like 847, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through a peripheral bus 849. Architectures for a peripheral bus include PCI, USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can be also be stored in RAM 846, whereas permanent data can be stored for example, in the internal mass storage 847. Fast storage and retrieval to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 800, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system can provide functionality as a result of logic hardwired or otherwise embodied in a circuit (for example: accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for fixed point implementation of a subdivision processing for video decoding, the method being performed by at least one processor, the method comprising:
   obtaining, from a coded bitstream, two vertices associated with an encoded mesh, the two vertices having integer components;
   determining a first normal vector associated with a first vertex and a second normal vector associated with a second vertex, wherein components of the first normal vector and the second normal vector are integers;
   determining a first normalized normal vector based on the first normal vector and a second normalized normal vector based on the second normal vector using an inverse square root function, a normalized normal vector is determined using a combination of a fix-point number with a first pre-defined number of digits, a right-shift operation by a second pre-defined number, and the components of the respective normal vector;
   determining a middle normalized normal vector associated with a middle-point, the components of the middle-point are determined based on a combination of the components of the first normal vector and the second normal vector and the right-shift operation by a third pre-defined number, and the middle normalized normal vector is determined using the combination of the fix-point number with the first pre-defined number of digits, the right-shift operation by the second pre-defined number, and the components of the middle-point;
   determining higher precision integer components for the two vertices based on a left-shift operation by a fourth pre-defined number; and
   decoding the encoded mesh based on the first normalized normal vector, the second normalized normal vector, and the middle normalized normal vector.

2. The method of claim 1, wherein the fix-point number is used to represent a fractional part of the normalized normal vector.

3. The method of claim 1, wherein the first normalized normal vector and the second normalized normal vector are determined based on the higher precision integer components.

4. The method of claim 1, wherein the components of the middle-point are determined based on the higher precision integer components for the two vertices.

5. The method of claim 1, wherein the middle normalized normal vector is determined based on the higher precision integer components for the two vertices.

6. An apparatus for fixed point implementation of a subdivision processing for video decoding, the apparatus comprising:

at least one memory configured to store program code; and at least one processor configured to read the program code and operate as instructed by the program code, the program code including:

first obtaining code configured to cause the at least one processor to obtain, from a coded bitstream, two vertices associated with an encoded mesh, the two vertices have integer components;

second determining code configured to cause the at least one processor to determine a first normal vector associated with a first vertex and a second normal vector associated with a second vertex, wherein components of the first normal vector and the second normal vector are integers;

third determining code configured to cause the at least one processor to determine a first normalized normal vector based on the first normal vector and a second normalized normal vector based on the second normal vector using an inverse square root function, a normalized normal vector is determined using a combination of a fix-point number with a first pre-defined number of digits, a right-shift operation by a second pre-defined number, and the components of the respective normal vector;

fourth determining code configured to cause the at least one processor to determine a middle normalized normal vector associated with a middle-point, the components of the middle-point are determined based on a combination of the components of the first normal vector and the second normal vector and the right-shift operation by a third pre-defined number, and the middle normalized normal vector is determined using the combination of the fix-point number with the first pre-defined number of digits, the right-shift operation by the second pre-defined number, and the components of the middle-point;

fifth determining code configured to cause the at least one processor to determine higher precision integer components for the two vertices based on a left-shift operation by a fourth pre-defined number; and decoding code configured to cause the at least one processor to decode the encoded mesh based on the first normalized normal vector, the second normalized normal vector, and the middle normalized normal vector.

7. The apparatus of claim 6, wherein the fix-point number is used to represent a fractional part of the normalized normal vector.

8. The apparatus of claim 6, wherein the first normalized normal vector and the second normalized normal vector are determined based on the higher precision integer components.

9. The apparatus of claim 6, wherein the components of the middle-point are determined based on the higher precision integer components for the two vertices.

10. The apparatus of claim 6, wherein the middle normalized normal vector is determined based on the higher precision integer components for the two vertices.

11. A non-transitory computer-readable medium storing instructions, the instructions comprising: one or more instructions that, when executed by one or more processors of a device for fixed point implementation of a subdivision processing for video decoding, cause the one or more processors to:

obtain, from a coded bitstream, two vertices associated with an encoded mesh, the two vertices have integer components;

determine a first normal vector associated with a first vertex and a second normal vector associated with a second vertex, wherein components of the first normal vector and the second normal vector are integers;

determine a first normalized normal vector based on the first normal vector and a second normalized normal vector based on the second normal vector using an inverse square root function, a normalized normal vector is determined using a combination of a fix-point number with a first pre-defined number of digits, a right-shift operation by a second pre-defined number, and the components of the respective normal vector;

determine a middle normalized normal vector associated with a middle-point, the components of the middle-point are determined based on a combination of the components of the first normal vector and the second normal vector and the right-shift operation by a third pre-defined number, and the middle normalized normal vector is determined using the combination of the fix-point number with the first pre-defined number of digits, the right-shift operation by the second pre-defined number, and the components of the middle-point;

determine higher precision integer components for the two vertices based on a left-shift operation by a fourth pre-defined number; and decode the encoded mesh based on the first normalized normal vector, the second normalized normal vector, and the middle normalized normal vector.

12. The non-transitory computer-readable medium of claim 11, wherein the fix-point number is used to represent a fractional part of the normalized normal vector.

13. The non-transitory computer-readable medium of claim 11, wherein the first normalized normal vector and the second normalized normal vector are determined based on the higher precision integer components.

14. The non-transitory computer-readable medium of claim 11, wherein the middle normalized normal vector is determined based on the higher precision integer components for the two vertices.

* * * * *